July 15, 1958
J. A. PAGLEY
2,842,930
SELF-CLEANING RAKE
Filed Dec. 2, 1957
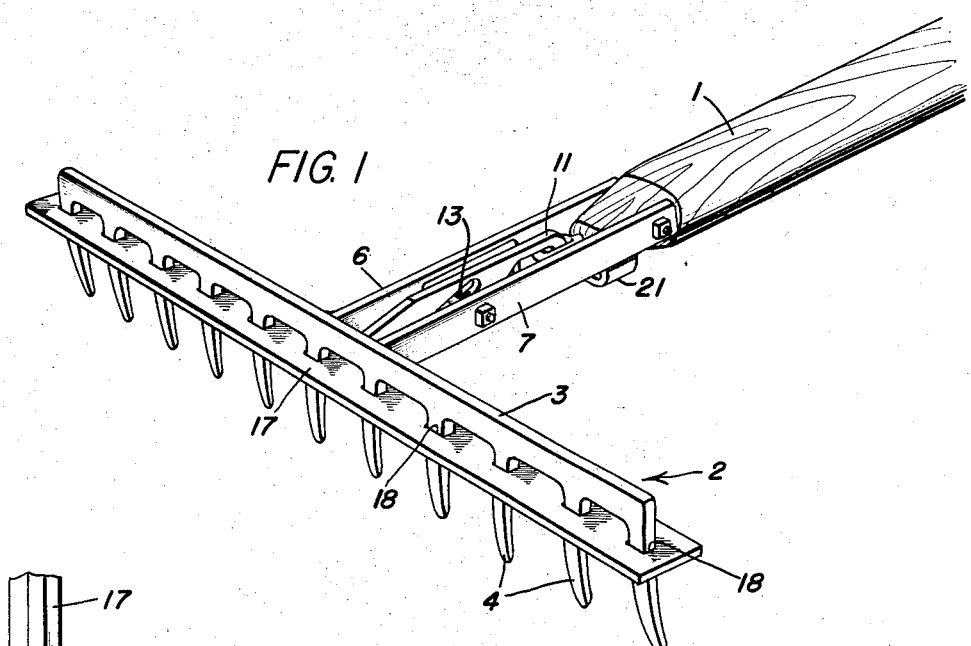
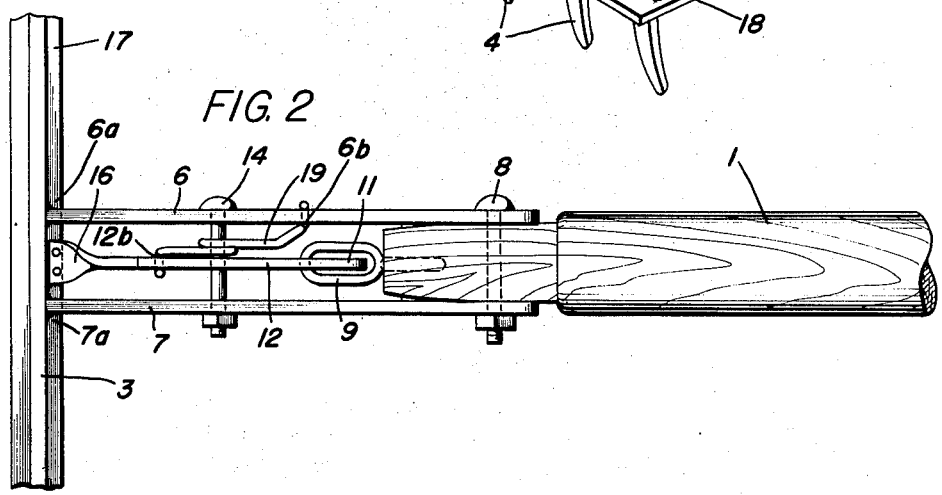
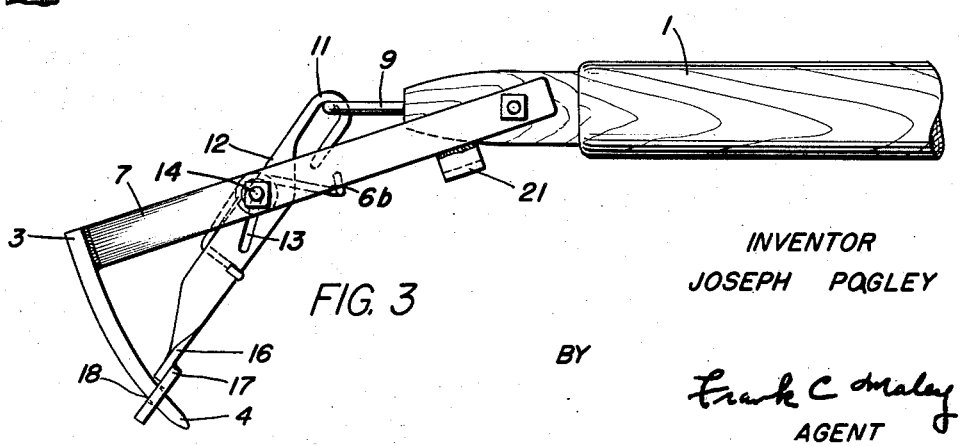
INVENTOR
JOSEPH PAGLEY
BY
*Frank C. Maley*
AGENT

United States Patent Office 2,842,930
Patented July 15, 1958

2,842,930

SELF-CLEANING RAKE

Joseph A. Pagley, Pittsburgh, Pa.

Application December 2, 1957, Serial No. 700,190

1 Claim. (Cl. 56—400.08)

The present invention relates to metallic garden rakes, and more particularly to a self-cleaning metallic garden rake.

It is an object of the present invention to provide a garden rake, the tines of which may be cleaned by shaking the rake.

It is another object of the present invention to provide a garden rake in which grass and leaves and other material may be readily cleaned from the tines of the rake simply by shaking the rake.

It is yet another object of the present invention to provide a self-cleaning metallic garden rake utilizing a rectangular sheet of metal having a plurality of holes therein such that the sheet may be slid over the tines of the rake and further utilizing a structure for securing the plate to the rake such that the plate is initially at the upper ends of the tines and may be caused to reciprocate along the length of the tines by shaking of the handle of the rake.

The above and still further objects, features and advantages of the present invention will become apparent upon consideration of the following detailed description of one specific embodiment thereof, especially when taken in conjunction with the accompanying drawings, wherein:

Figure 1 is a perspective view of the rake of the present invention;

Figure 2 is a top view of the rake of the present invention; and

Figure 3 is a side view of the rake of the present invention, showing the mechanism in its extended or actuated position.

Referring specifically to the figures of the accompanying drawing, there is provided a garden rake comprising a handle 1 and a head portion 2 including a metal bar 3 extending perpendicularly to the handle 1 and having a plurality of tines 4 depending downwardly therefrom as viewed in Figures 1 and 3 of the accompanying drawings. A pair of parallel rectangular arms 6 and 7 extend perpendicular to the bar and have one end of each suitably secured, as by welding 6a and 7a, to the back surface of the bar 3. The parallel arms 6 and 7 are pivotally secured to the handle 1 by means of a bolt 8 extending through suitable apertures in the arms 6 and 7 and in the handle 1, the members 6 and 7 being disposed on opposite sides of the handle. In consequence of this arrangement, the head 2 of the rake is rotatable about the bolt 8 for purposes which become apparent subsequently.

An eye 9 is secured to the end of the handle 1, disposed between the members 6 and 7, and is adapted to engage a hook 11 formed in one end of a link 12. The link 12 is provided with a centrally disposed elongated slot 13 adapted to receive a bolt 14 which extends through apertures in the side members 6 and 7. The end of the link 12 remote from the hook 11 is rotated 90° so as to provide an end portion 16 parallel to and secured to the upper surface of a rectangular plate 17.

The plate 17 is provided with a plurality of apertures 18 of such a size as to snugly receive the tines 4 of the rake. The plate 17 is provided with a number of apertures 18 corresponding to the number of tines 4 and is inteded to be reciprocated along the vertical length of the tines 4 to clean the rake. The plate is biased into the position illustrated in Figure 1 by means of a coil spring 19 which is disposed about the bolt 14 and engages the side member 6 and the link 12 so as to maintain the forward end of the link in its uppermost position and through the bolt 14, maintain the head 2 in its raised position with the arms 6 and 7 effectively forming extensions of the handle 1. The member 6 and the link 12 are notched at 6b and 12b so as to receive the ends of the springs 19 so as to positively retain the same in position. The structure of the apparatus is completed by means of a reinforcing cross bar 21 disposed between the side members 6 and 7 adjacent the end of the handle 1, which bar also serves to limit upper movement of the arms 6 and 7.

When it is desired to utilize the rake of the present invention, it may be employed as a conventional rake except when it is desired to produce self-cleaning thereof. When self-cleaning is to be effected, the rake is moved in rapid strokes parallel to the direction of the tines 4 and as a result the head end 2 and the side members 6 and 7 rotate downwardly as a unit about the bolt 8 when the handle 1 of the rake is moved rapidly upward as viewed in Figures 1 and 3 of the accompanying drawings. As the head 2 and arm 6 and 7 move downwardly, the center of the link 12 is also forced down by the bolt 14 and since the upper end of the link 12 is held by the eye 9, the link is caused to rotate about the bolt 14.

It can readily be seen that the angle through which the link 12 rotates is considerably greater, due to its shorter length, than the angle through which the members 6 and 7 rotate and therefore the plate 17 traverses a greater angle of rotation than the head 2 of the rake and relative movement is produced between the plate 17 and the tines 4. As the plate 17 moves downwardly over the surface of the tines 4, material which may have become wedged between or empaled upon the tines 4 is pushed downwardly and off of the tines to produce cleaning thereof. Upon termination of rapid movement of the rake handle, the spring 19 returns the head portion 2 and the link 12 to a position illustrated in Figure 1, as determined by bar 21.

It should be noted that the slotted aperture 13 in the link 12 is required since the centers of rotation of the link 12 and the members 6 and 7 are different and therefore relative longitudinal movement is produced between the link 12 and the bolt 14 which must be compensated for by the utilization of the slotted aperture 13.

It is obvious from the above that the self-cleaning rake of the present invention does not require the user to resort to the usually messy and slow cleaning procedure which entails removing by hand the material impaled on the tines or stuck therebetween. Further advantage of the apparatus of the invention is that the cleaning process is more rapidly accomplished than is possible by hand.

While I have described and illustrated one specific embodiment of my invention, it will be clear that variations of the details of construction which are specifically illustrated and described may be resorted to without departing from the true spirit and scope of the invention as defined in the appended claim.

What I claim is:

A self-cleaning rake comprising a rake handle, a rake head having a cross bar disposed perpendicular to the said rake handle and a plurality of tines depending downwardly therefrom, parallel bars having one end of each secured to said cross bar and the other end pivotally secured to said rake handle adjacent one end thereof, an eye hook secured in said one end of said rake handle, a rectangular plate having a plurality of apertures therein, at least equal to the number of tines of said rake, said plate being initially disposed with said tines in said apertures, a link having one end secured to said plate and having a hook at its other end in engagement with said eye hook, said link having an elongated inclined slot disposed substantially centrally thereof, a bolt passing through said parallel members and through said slotted aperture and spring means for biasing said plate adjacent said cross bar, said spring means comprising a spring disposed about said bolt and having ends engaging under one of said parallel bar and said link, said one parallel bar and said link having notches in the undersides thereof for the reception of said ends, and a cross member extending between the undersides of said parallel bars beneath said handle to limit movement of said bars and hence said rake head in one direction.

References Cited in the file of this patent

UNITED STATES PATENTS

| | | |
|---|---|---|
| 1,144,703 | Goodsell | June 29, 1915 |
| 1,244,789 | Stetson | Oct. 30, 1917 |